(12) United States Patent
Ashour et al.

(10) Patent No.: US 7,024,394 B1
(45) Date of Patent: Apr. 4, 2006

(54) SYSTEM AND METHOD FOR PROTECTING USER LOGOFF FROM WEB BUSINESS TRANSACTIONS

(75) Inventors: Gal Ashour, San Jose, CA (US); Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 954 days.

(21) Appl. No.: 09/611,934

(22) Filed: Jul. 7, 2000

(51) Int. Cl.
*G06F 17/60* (2006.01)

(52) U.S. Cl. .............................. 705/64; 705/67; 705/50; 713/186

(58) Field of Classification Search .................. 705/77, 705/51, 58, 57, 64, 67, 50; 713/200, 201, 713/202, 165, 186
See application file for complete search history.

(56) References Cited

U.S. PATENT DOCUMENTS

| | | | | |
|---|---|---|---|---|
| 5,471,670 A | * | 11/1995 | Hess et al. | 455/33.2 |
| 5,893,118 A | * | 4/1999 | Sonderegger | 707/203 |
| 6,014,643 A | | 1/2000 | Minton | 705/37 |
| 6,023,684 A | | 2/2000 | Pearson | 705/35 |
| 6,032,184 A | | 2/2000 | Cogger et al. | 709/223 |
| 6,067,354 A | | 5/2000 | Bauer et al. | 379/113 |
| 6,088,451 A | * | 7/2000 | He et al. | 726/8 |
| 2001/0042051 A1 | * | 11/2001 | Barrett et al. | 705/65 |
| 2002/0198745 A1 | * | 12/2002 | Scheinuk et al. | 705/4 |

FOREIGN PATENT DOCUMENTS

| | | | |
|---|---|---|---|
| JP | 411085890 A | * | 3/1999 |
| JP | 411338824 A | * | 12/1999 |
| JP | 02002055827 A | * | 2/2002 |

OTHER PUBLICATIONS

IBM Technical Disclosure Bulletin,Title: mechanism for secure of-site computer access, TDB-ACC-NO: NN85046754, Apr. 1985.*

* cited by examiner

*Primary Examiner*—Elisca Pierre Eddy
(74) *Attorney, Agent, or Firm*—Samuel A. Kassatly

(57) ABSTRACT

A computer program product is provided as a system and associated method for use with a web browser and an Internet, to improve the access security to a secure web site and to protect the user from undesirable hacking. The system presents a novel, secure, implicit log-off procedure in addition to the conventional express log-off and cookie termination. The implicit log-off procedure reduces the risks resulting from transiting to an insecure site while remaining logged onto a secure site. The system is comprised of a secured transaction protection module implemented on a business server that includes a security/identification module and a local database; and a notification module which is implemented on the user's browser. The system tracks the user's access state to the server, and issues a termination command shortly as soon as the notification module detects migration to another site or to an insecure page on the same site.

15 Claims, 3 Drawing Sheets

SYSTEM AND METHOD FOR PROTECTING USER LOGOFF FROM WEB BUSINESS TRANSACTIONS

FIELD OF THE INVENTION

The present invention relates to the field of data processing, and particularly to a software system and associated method to assist users and institutions improve the security and resource allocation of on-line transactions. More specifically, the present invention relates to a method for protecting users conducting secure ebusiness transactions from undesirable hacking when they leave the secure sites.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" includes a hyperlink that points to a Uniform Resource Locator (URL) location or web page.

In addition to the hyperlink, certain search result pages include a short summary or abstract that describes the content of the URL location. Typically, search engines generate this abstract from the file at the URL, and only provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description," "keywords," etc., from "heading" tag values (e.g., H1, H2 tags), or from some combination of the content of these tags.

With its links to computers and computer networks throughout the world, the Internet offers nearly limitless access to information. Much of the information is public and is available to all users. Other information is private and access must be limited. However, the same interconnectivity that makes information so readily available places a special burden on those systems involved in the exchange or storage of private information. This security aspect is of particular importance in the face of widespread hacking, i.e., using computers to gain unauthorized access to other computer systems and to actively steal, destroy or otherwise corrupt electronic information. Tight security is also warranted in the case of multi-user facilities where a single computer terminal is accessible to many clients.

As an example, businesses that ply their trade on the Internet (ebusinesses), must rely on client-server interchanges over the Internet rather than more traditional face-to-face or voice interactions. This interchange between the client and the server, occurring between client log-on and log-off, may be viewed as a business transaction, with intrinsic benefits and risks to both the ebusiness and the client. To minimize the risk and maximize the benefits associated with the transaction, the information exchanged between the client and ebusiness server must remain secure. In particular, the ebusiness must implement secure user log-on and log-off facility for the exchange of this non-public information.

In an ebusiness transaction, users seeking to access private information typically begin their transaction by first logging into a standard log-in facility. At this point they can access the secure information by providing a password or other information to the ebusiness server that identifies them as having legitimate access to given information. Ideally, the client would exchange information with the ebusiness and then log off expressly, ending the secure connection. In reality, there may be periods when the client is completely inactive but remains connected, perhaps while distracted. There may be other times when the client chooses to access another web site that is not secure. In the case of a multi-user facility such as a kiosk, the client may inadvertently leave without ending their session by logging off. In each of these cases the results are the same:

1. The client remains connected to the site even if not actively using it.
2. The client becomes prone to the theft or corruption of electronic information.
3. The ebusiness expends valuable resources maintaining a secure connection that is either under-utilized or un-utilized.
4. If the user goes to another site and then shortly thereafter returns back to the secure site, the user might not be able to reconnect before the previous session has expired or timed out.

Periods of inactivity are unavoidable but represent a real threat to the security of the transaction. The difficulty in solving the problem lies in determining how and when a non-uniform and largely unpredictable secure session should be terminated.

The problem is further complicated by the structure of the Internet and the World Wide Web. The Web's Hypertext Transfer Protocol (HTTP) is stateless, meaning that all requests for information are equivalent. No information about the client is stored during previous or even current sessions. This leaves the servers with no intrinsic information about clients or the information they have requested.

Ebusinesses have attempted to mitigate and even solve this problem primarily though the use of cookies. Other implementations include embedding user information in a hidden location, or using CORBA/IIOP and JAVA RMI. Cookies are information placed on the hard disk of the client by the server to identify the user and store pertinent information about them. Typically, cookies are given a finite lifetime. In the context of secure Internet transactions, these cookies are used to log off the client after a specified period of inactivity, and represent a second primary type of log-off, with the first being the user-initiated express log-off.

The cookie solution for terminating sessions has several shortcomings. The fixed length of time for inactivity may result in log-offs before the client is ready to end the session. In the event that the user fails to expressly log off, the continued session may result in unauthorized access by other users. This may also extend to hackers who may take advantage of the lengthy connection times to gain access to private information.

There is currently no adequate mechanism by which inactive, secure Internet sessions can be terminated in an optimal way. The use of cookies is self-limiting and inflexible, treating all users in the same manner. There is currently no means of detecting a situation where a user may be endangering a secure transaction or private information by selecting a non-secure website while logged into a secure site. The need for such a mechanism has heretofore remained unsatisfied.

SUMMARY OF THE INVENTION

The present invention addresses problems associated with secure Internet connections that have not been properly terminated. It presents a novel secure log-off procedure in addition to the conventional express log-off and cookie termination. This additional log-off procedure is referred to herein as "implicit logoff" within the structure of a business/client transaction.

The implicit log-off procedure of the present invention reduces the risks to a user resulting from choosing an insecure site while logged onto a secure site. Users are provided with pop up warnings on their monitors, alerting them to the unattended pending connection to the secure site.

The implicit log-off procedure of the present invention mitigates the risk of losing control of private information as the result of a session that is not appropriately terminated by the user. "Smart" termination by detecting inactivity during the session and the failure by the user to heed warning messages reduces the chance of hacking and/or the risk that another individual may gain terminal access to the private information.

The implicit log-off procedure of the present invention mitigates the risk of losing private information as the result of a session that is terminated only after a pre-determined, universally prescribed timeout period set by a cookie. The existence of a browser with embedded "intelligence" can more exactly determine when a session should be terminated rather than having the session terminates only at the end of the cookie's predetermined time-out period.

The implicit log-off procedure of the present invention reduces the business the costs associated with a non-productive, secure session. Optimally terminated transactions can reduce hardware and software costs associated with secure transactions.

The implicit log-off procedure of the present invention avoids undesirable and/or unwarranted log-offs by providing to the user appropriate warnings. Users may determine their own appropriate warning/log-off period, and can avoid having a session terminated before business is complete.

Conventionally, secure sites do not allow end users to control the session time out period from several reasons: A long session period will consume excessive resources from the server; an excessively long session period increases the risk of hacking; and a short session period might adversely affect the user's access which will be interrupted by excessive logoffs.

The foregoing and other features of the present invention are realized by a system and method for protecting user logoff from web business transactions. The system is comprised of a secured transaction protection module implemented on a business server that includes a security/indentification module and a local database; and a notification module which is implemented on the user's browser.

The ebusiness protection system can track the user's access state according to any one or more of the following implementations:

1. A browser add-on, i.e., the notification module, tracks the user's access state.
2. A proxy server tracks the user's access state.
3. The business server tracks the user's access state.

The ebusiness protection system of the present invention solves the Internet log-off problem by implementing an implicit log-off procedure. In this implementation, an add-on notification module to the user's browser that is completely transparent to the user, sends a message to the ebusiness server notifying it that the client is no longer actively involved in a secure, online transaction. This notification may result from total inactivity on the part of the client, from the client's choice of another site or page that is not secure, or from simply leaving the secure site.

The ebusiness server reacts to the notification from the user's notification module by limiting the loss of secure information and resources expended on a client who is no longer actively involved in the secure transaction. Specifically, the server may terminate the session immediately or after a brief period of time. It may send a warning message to the client that the connection will be terminated, or it may give the client the option of setting the time to termination. Alternatively, the server may send to the client's computer a cookie with a short life or issue an expiration command to a cookie already residing on the client's computer.

In use, the user visits a website of a business using a web browser. The ebusiness protection system of the present invention initializes the user access state to "non-login." At some point, the user enters a secure region through log-in or other means. The system changes the user state to "log-in." At this point, the monitoring system (browser) begins to track the user's activity. Subsequently, one of the following events may occur:

a) The user selects a new URL. If this URL is a secure region within the same business site, the warning system remains dormant pursuant to the ebusiness site administrator policy or discretion.

b) The user selects a new URL. If this URL is outside the business space, such as for example the URL of another business, the system may be configured to bring up a warning pop-up window on the user's monitor, informing the user that he or she is leaving the security zone. The user is given the opportunity to log off from the secure connection.

c) The user selects a non-secure region of the same business site. The system may optionally warn the user. Repeated warnings to the user can cause annoyance and, hence, the system allows the user to turn off these warnings.

d) The user may enter a period of inactivity within the secure site. After a preset duration the warning system brings up a pop-up window to warn the user that he or she should continue the transaction, log off, or set the time out duration to a period of his or her own choice. Should the client fail to respond in a pre-determined time the system may log off the user.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
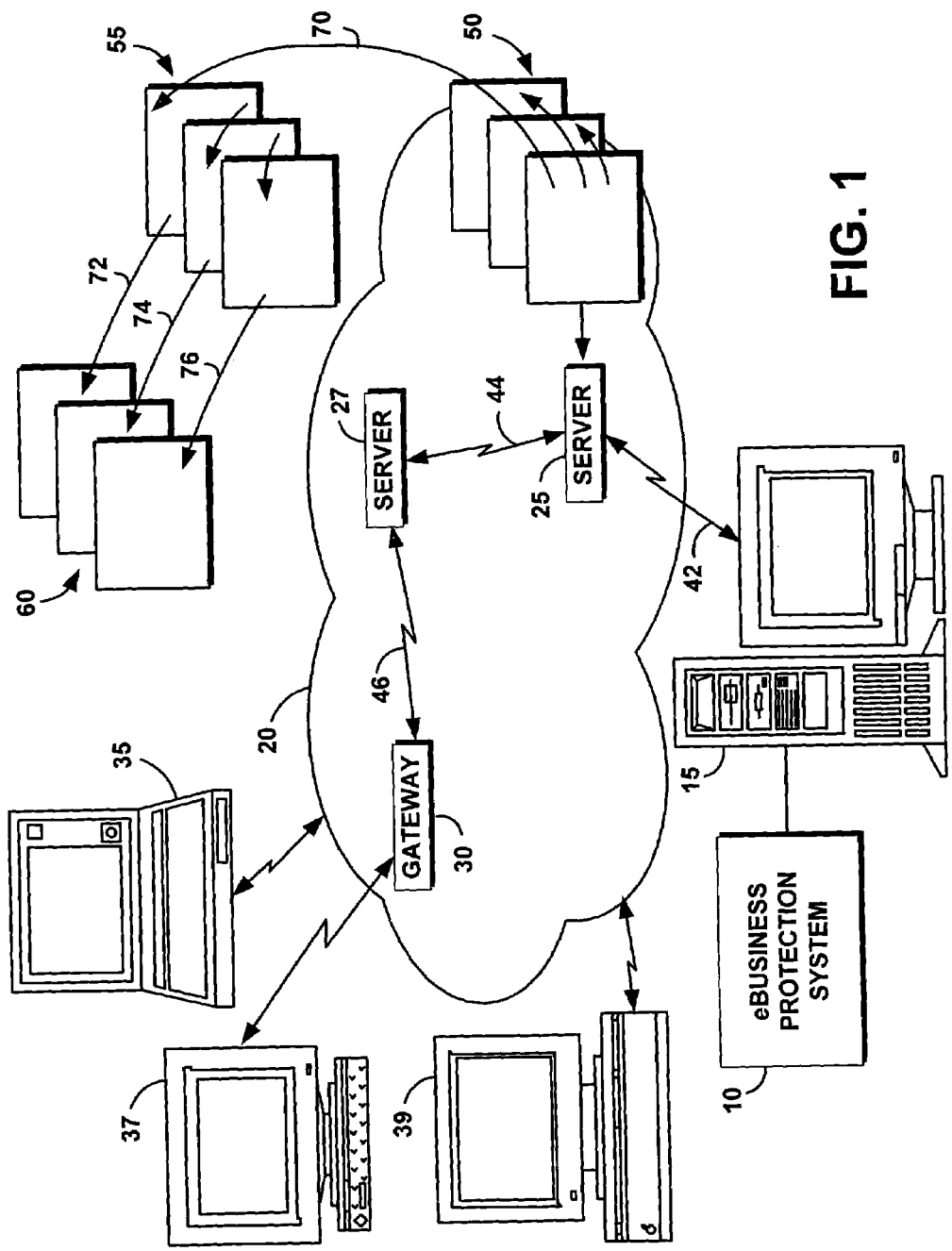
FIG. 1 is a schematic illustration of an exemplary operating environment in which a protection system of the present invention can be used.

The following definitions and explanations provide background information pertaining to the technical field of the present invention, and are intended to facilitate the understanding of the present invention without limiting its scope:

Cookie: Information supplied by a server and placed on a client's side of a client/server communication. Cookies typically reside on the client's hard disk and provide information to the server about the client. In the majority of cases, cookies have a finite lifetime.

Firewall: An electronic barrier placed between the server and the Internet for the protection of information residing on the server or systems networked to the server. A user is allowed to pass through the firewall only after providing an appropriate level of authentication.

Internet: A collection of interconnected public and private computer networks that are linked together with routers by a set of stand protocols to form a global distributed network.

Ebusiness: business transactions conducted online, that is using the Internet.

Secure Transaction: An Internet interchange characterized by communication that is encrypted or otherwise protected (to varying degrees) from interception, deciphering, or compromise. A secure transaction, as an example, may involve online banking where a client checks the balance of a particular account and then chooses to move funds from that account to another. As another example, a client may choose to engage in online trading of stocks. A secure transaction is required to protect the client and stockbroker from the compromise of information that could result in unauthorized trades, loss of funds, or disclosure of private information.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

FIG. 1 portrays the overall environment in which an ebusiness protection system 10 according to the present invention may be used. The system 10 includes a software or computer program product that is typically embedded within, or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15, which could potentially span more than one machine, is connected to the network 20 via a communications link such as a telephone, cable, or satellite link. The servers 25, 27 can be connected via high-speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
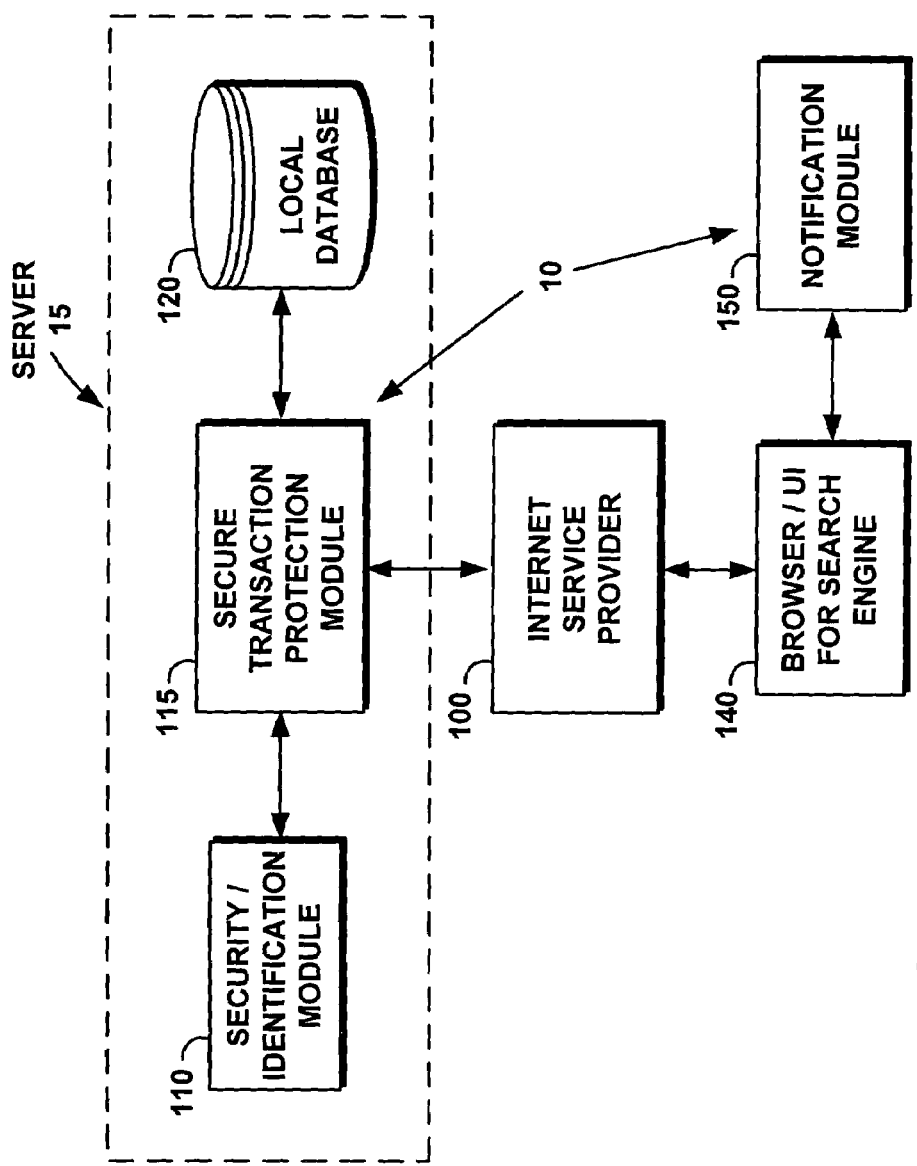
FIG. 2 is a block diagram that illustrates a high level architecture of the protection system of FIG. 1 shown used in the context of ebusiness.

FIG. 2 illustrates a high level architecture showing the system 10 used in the context of an ebusiness secure transaction. Residing on the ebusiness server 15 as part of the system 10, are a security/identification module 110, a secure transaction protection module 115, and a local database 120. The security/identification module 110 is responsible for validating client access to the server 10. The local database 120 contains information, potentially both public and private. Private information is accessible via the server 15 after user identification and validation by the security/identification module 110.

Queries initiated by clients originate at the browser 140 and are transmitted via the local internet service provider 100 to the server 15. Transactions take place between the server 15 and the client using the browser 140.

In operation, a secure transaction between a client represented by the browser 140, and the ebusiness server 15 is initiated by the client's browser 140 by selecting and entering the URL of the server 15. Communication between the browser 140 and the server 15, using the Internet service provider 100 as an intermediary, gives the client access to the server 15 and to the web pages and other information residing on the server 15.

The user chooses the desired type of secure transaction. At this time the secure transaction protection module 115, in conjunction with the security/identification module 110, query the client for information that validates the user's access privileges and may place a cookie on the hard disk of the user's computer. Once the user's identity and access rights are established, the client is allowed to pass through the firewall of the server 15, and to access secure information stored on the local database 120.

The client may initiate a business transaction at any time during this connection to the server 15 and gain access to the secure information stored on the local database 120. Information is transferred between the server 15 and the user's browser 140 by means of the Internet service provider 100.

As in currently existing secure systems, the client has the ability to end the session by expressly logging off from the server 15, or by terminating activity at the secure site for a protracted period of time, thus allowing the cookie stored on the computer to expire. By either of these two methods the secure connection between the client's browser 140 and the server 15 is ended and the transaction period terminates.

In addition to these two log-off procedures, the system 10 enables what is referred to herein as "implicit log-off". To this end, a notification module 150 is incorporated as an add-on component to the browser 140. Alternatively, the notification module 150 may be implemented on a proxy server or the business server 15.

In a preferred embodiment, the notification module 150 is embedded into the client browser 140 (FIG. 2) to intercept and track all hyperlinks through which the user navigates. Once it recognizes that the user wishes to exit the secure domain, either expressly by a new domain address which is entered explicitly by the user, through a bookmark, or through a link from the current site, the notification module 150 will either directly send a notification to the server 15 that will trigger an implicit logoff on the server side (i.e., free session's resources), or will pop-up a window to the user on the client browser 140, notifying the user that the current secure session will be terminated, and then take the appropriate action pursuant to the user's feedback to the pop-up message.

Figure 3:
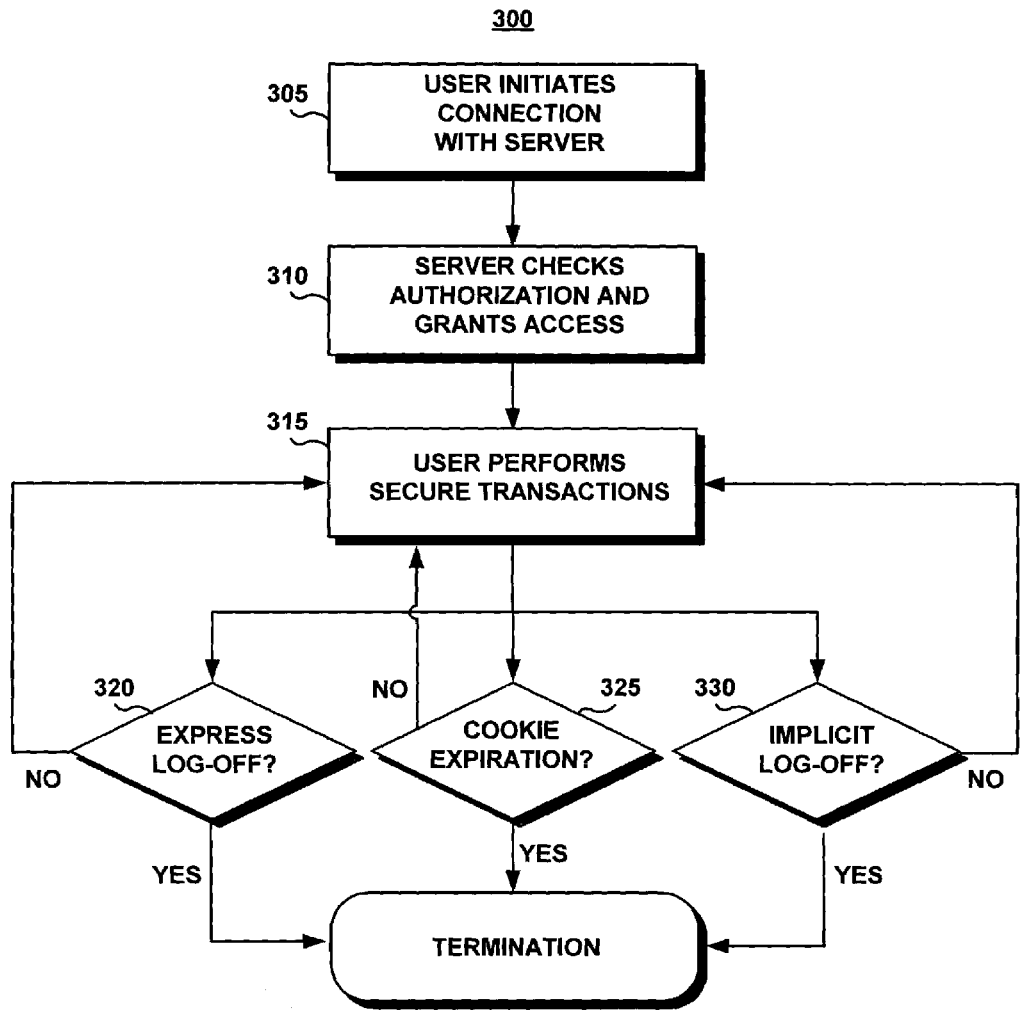
FIG. 3 is a flow chart that depicts the operation of the protection system of FIGS. 1 and 2.

Referring now to FIG. 3, it depicts a flowchart that illustrates a method or process flow 300 in an ebusiness transaction implemented by the system 10 of the present invention. The user wishing to execute a secure transaction, starts at step 305 by initiating a connection with the ebusiness server 15. The user then chooses an option on the server 15 that requires a secure transaction.

At step 310, the server 15, receiving responses to its queries, checks the user's authorization and grants access once appropriate responses are received from the user. A cookie may then be placed on the user's computer, defining a maximum time of inactivity before the secure connection expires.

At this stage, the user, given access to secure information, performs one or more secure transactions at step 315. As long as the user remains active and stays within a secure region of the server 15, no action is taken by the protection system 10 and the connection is maintained. At a certain time in the future the user activity at the chosen web site ceases. This may occur because the user has completed the desired transaction or because the user has become distracted, needs time to consider options, or has chosen to go to another web site.

If the transaction has ended and the user expressly logs off, then the system 10 detects such express log-off at step 320 and the session is terminated.

If the user's activity ceases for a predetermined period of time (step 325), or if a non-secure web site is chosen by the user, the protection system 10 provides an appropriate warning message that appears on the screen of the user's computer. In the case of protracted inactivity, the user is advised that the session may be terminated immediately or within a brief period of time. Alternatively, the user may be asked to provide an appropriate time out period of his or her own choosing, in effect, customizing the system for his or her own use.

In the event that the user enters another web site while still logged into the secure site, and in particular one associated with an ebusiness other than the one supporting the secure transaction, a warning message may be displayed on the user's monitor. The warning informs the user that he or she may be in danger of compromising secure information and is advised to log-off from the secure site. Failure by the user to respond appropriately to the warning messages results in an implicit log-off at step 330, which means that the client will implicitly send the log-off message event to the server 15 without the user explicitly choosing the logout option.

In particular, the system 10, determining that the user is no longer actively accessing the secure site, and is failing to heed warnings, terminates the secure session. This may be accomplished by issuing a short-lived cookie or by sending an expiration command to the cookie that already resides on the user's computer. This results in a cookie expiration at step 325 as initiated by the system's implicit logoff functionality. Alternatively to sending a cookie to the user or terminating a currently residing cookie, the system may just free up the resources it allocated for this secure session on the server side, and thus any future transaction initiated from the client will be rejected by the server 15 until the client goes through the log-in procedure anew, to regain access.

The system 10 described herein maintains the key features of existing secure systems but increases the security of a net-based transaction by including the functionality of an implicit log-off (step 330). The addition of the implicit log-off feature increases the security of the system 10, protecting both the ebusiness and the user from unauthorized activity. In addition, the business is able to more optimally use valuable resources, rather than expend them on non-productive sessions. Also, if the user leaves the secure site without an explicit logoff and then shortly afterwards returns back to the same site, the user will be able to easily login again without delay; whereas in conventional systems, the user would have to wait until the previous session has expired by its cookie timeout, for example 10 minutes.

It is to be understood that the specific embodiments of the invention that have been described are merely illustrative of certain application of the principle of the present invention. Numerous modifications may be made to the ebusiness protection system and associated method described herein without departing from the spirit and scope of the present invention. Moreover, while the present invention is described for illustration purpose only in relation to the WWW, it should be clear that the invention is applicable as well to databases and other tables with indexed entries.

The invention claimed is:

1. A system for assisting a user conducting a transaction on a secure site of a server to implicitly logoff from the secure site, comprising:
   the server including:
      a secure transaction protection module that tracks a user's access state to the server;
      a database in communication with the secure transaction protection module, for storing data to be accessed by the user;
      an identification module for validating the user's access to the database; and
      a notification module for notifying the secure transaction protection module of a user's request to initiate a session on the server;
   wherein if the user selects an insecure site while logged on to the secure site of the server, the notification module sends a warning notice to the user to alert the user of an impending logoff from the secure site, and further sends a termination command to the secure transaction protection module for implicitly logging off the user from the secure site; and
   wherein the secure transaction protection module causes the session to be terminated in response to the termination command, absent an instruction from the user to maintain a connection with the secure site.

2. The system according to claim 1, wherein the secure transaction protection module provides the user with an option to set the time to termination.

3. The system according to claim 1, wherein the secure transaction protection module sends a cookie with a short life to the notification module to terminate the session following the expiration of the cookie.

4. The system according to claim 1, wherein the secure site is a web site with an address; and
   wherein the user exits the secure site by transiting to another address.

5. The system according to claim 1, wherein the transaction is an ebusiness transaction.

6. The system according to claim 5, wherein the user accesses the secure site using a web browser.

7. The system according to claim 6, wherein the notification module is implemented on the web browser.

8. A computer program product for assisting a user conducting a transaction on a secure site of a server to implicitly logoff from the secure site, comprising:
   the server including:
      a secure transaction protection module that tracks a user's access state to the server;
      a database in communication with the secure transaction protection module, for storing data to be accessed by the user;
      an identification module for validating the user's access to the database; and
   a notification module for notifying the secure transaction protection module of a user's request to initiate a session on the server;
   wherein if the user selects an insecure site while logged on to the secure site of the server, the notification module sends a warning notice to the user to alert the user of an impending logoff from the secure site, and further sends a termination command to the secure transaction protection module for implicitly logging off the user from the secure site; and
   wherein the secure transaction Protection module causes the session to be terminated in response to the termination command, absent an instruction from the user to maintain a connection with the secure site.

9. The computer program product according to claim 7, wherein the secure transaction protection module provides the user with an option to set the time to termination.

10. A method for implicitly logging off a user conducting a transaction on a secure site of a server from the secure site, comprising:
    tracking a user's access state to the server;
    storing data to be accessed by the user;
    validating the user's access to the database;
    notifying the secure transaction protection module of a user's request to initiate a session on the server;
    wherein if the user selects an insecure site while logged on to the secure site of the server, sending a warning notice to the user to alert the user of an impending logoff from the secure site, and further issuing a termination command to the secure transaction protection module for implicitly logging off the user from the secure site; and
    causing the session to be terminated in response to the termination command, absent an instruction from the user to maintain a connection with the secure site.

11. The method according to claim 10, further comprising providing the user with an option to set the time to termination.

12. The method according to claim 10, wherein issuing the command includes sending a cookie with a short life to the notification module to terminate the session following the expiration of the cookie.

13. The method according to claim 10, wherein exiting the secure site includes transiting to another site.

14. The method according to claim 10, further including performing an ebusiness transaction.

15. The method according to claim 14, wherein accessing the secure site includes using a web browser.

* * * * *